United States Patent [19]
Clenet

[11] Patent Number: 5,848,853
[45] Date of Patent: Dec. 15, 1998

[54] VEHICLE BODY SPACE FRAME

[75] Inventor: Alain J-M Clenet, Santa Barbara, Calif.

[73] Assignee: Asha Corporation, Santa Barbara, Calif.

[21] Appl. No.: 778,248

[22] Filed: Jan. 8, 1997

[51] Int. Cl.⁶ .............................. B62D 27/00; F16B 5/08
[52] U.S. Cl. .................... 403/272; 403/205; 403/237; 296/29; 296/205; 280/781
[58] Field of Search .............................. 403/12, 270, 271, 403/272, 205, 403, 230, 233–235, 237, 247, 256; 291/29, 30, 205; 260/781, 785; 52/648.1

[56] References Cited

U.S. PATENT DOCUMENTS

| | | | |
|---|---|---|---|
| 1,760,955 | 6/1930 | Moss | 403/271 X |
| 2,149,844 | 3/1939 | George | 296/29 X |
| 2,387,154 | 10/1945 | Kalwitz | 403/237 X |
| 2,389,907 | 11/1945 | Helmuth . | |
| 2,562,483 | 7/1951 | Bender | 403/247 |
| 3,292,969 | 12/1966 | Eggerts, Jr. . | |
| 3,363,934 | 1/1968 | Peters . | |
| 3,637,252 | 1/1972 | Metsker . | |
| 3,944,008 | 3/1976 | Moore . | |
| 4,045,075 | 8/1977 | Pulver . | |
| 4,355,844 | 10/1982 | Fantini Muzzarelli . | |
| 4,440,434 | 4/1984 | Celli . | |
| 4,453,763 | 6/1984 | Richards . | |
| 4,618,163 | 10/1986 | Hasler et al. . | |
| 4,660,345 | 4/1987 | Browning . | |
| 4,798,400 | 1/1989 | Kosuge . | |
| 4,799,708 | 1/1989 | Handa et al. . | |
| 5,015,116 | 5/1991 | Nardone et al. | 403/205 X |
| 5,094,313 | 3/1992 | Mauws . | |
| 5,213,386 | 5/1993 | Janotik et al. . | |
| 5,320,403 | 6/1994 | Kazyak . | |
| 5,332,281 | 7/1994 | Janotik et al. . | |
| 5,338,080 | 8/1994 | Janotik et al. . | |

FOREIGN PATENT DOCUMENTS

| | | | |
|---|---|---|---|
| 1262629 | 4/1961 | France | 403/237 |
| 514145 | 2/1955 | Italy | 403/237 |

*Primary Examiner*—Harry C. Kim
*Attorney, Agent, or Firm*—Brooks & Kushman P.C.

[57] ABSTRACT

A metallic connector (48) secures the terminal end (50) of a first metallic tubular member (28) to an intermediate portion (52) of a second metallic tubular member (30). The connector (48) includes an end connection portion (54) having an opening (56) that receives the terminal end (50) of the first tubular member (28) and also includes a saddle portion (58) that extends from the end connection portion and receives the intermediate portion (52) of the second tubular member (30). Opposite ends (60) of the saddle portion (58) each includes a pair of spaced clamp attachers (62) for securing a clamp to permit the assembly by a connection (64) that includes a filler alloy (66) that is preferably a brazing material. The first and second tubular members (28,30) as well as the connector (48) are preferably made from stainless steel.

12 Claims, 3 Drawing Sheets

VEHICLE BODY SPACE FRAME

TECHNICAL FIELD

This invention relates to a vehicle body space frame made from tubular members.

BACKGROUND ART

Vehicle body space frames have previously been made from tubular members such as disclosed by U.S. Pat. Nos. 2,389,907 Helmuth; 3,292,969 Eggert, Jr.; 3,363,934 Peters; 3,637,252 Metsker; 3,944,008 Moore; 4,045,075 Pulver; 4,355,844 Fantini Muzzarelli; 4,440,434 Celli; 4,453,763 Richards; 4,618,163 Hasler et al; 4,660,345 Browning; 4,798,400 Kosuge; 4,799,708 Handa et al; 5,094,313 Mauws; 5,213,386 Janotik et al; 5,320,403 Kazyak; 5,332,281 Janotik et al; and 5,338,080 Janotik et al.

Welding is the conventional way to secure the tubular members to each other in vehicle body space frames such as disclosed by the above mentioned patents. When such welding involves securing the terminal end of one tubular member to an intermediate portion of another tubular member in a transversely extending relationship, the tubes must be relatively thick in order to be able to withstand thermal weld stresses and stresses that result from concentrated loading of the tubular members adjacent the weld. Furthermore, in certain developing areas of the world, electrical power is not always available to permit welding.

DISCLOSURE OF INVENTION

An object of the present invention is to provide an improved vehicle body space frame made from tubular members secured to each other.

In carrying out the above object, the vehicle body space frame includes a first metallic tubular member having a terminal end. A second metallic tubular member of the space frame has an intermediate portion that is located adjacent the terminal end of the first tubular member in a transversely extending relationship. A connector of the space frame includes an end connection portion having an opening that receives the terminal end of the first tubular member in a secured relationship. The connector also includes a saddle portion that extends from the end connection portion and receives the intermediate portion of the second tubular member. The saddle portion has opposite ends each of which includes a pair of spaced clamp attachers for use in clamping the saddle portion against the intermediate portion of the second tubular member for assembly. A connection of the connector includes a filler alloy that secures the saddle portion to the intermediate portion of the second tubular member.

The construction of the vehicle body space frame as described above can be finally assembled without the need for any final welding upon securing the connector to the second tubular member by virtue of the clamp attachers that permit clamps to space the connector end portion sufficiently close to the second tubular member so that the filler alloy connection can be effective in securing the connector. Also, since the connector saddle portion ends are not welded to the second tubular member, thinner material stock can be utilized for weight savings as well as permitting cost reduction that also allows stainless steel to be economically utilized to make the first and second tubular members as well as the connector. This eliminates the need for any rustproof coating of the space frame.

In the preferred construction, the first and second tubular members each have a wall thickness t and a maximum cross-sectional dimension that is at least 40 times its wall thickness t. More specifically, the first and second tubular members preferably each have a round cross section, and each of the round tubular members has a wall thickness t as well as having a diameter D that is at least 40 times its wall thickness t.

In the preferred construction of the space frame, each end of the saddle portion of the connector includes a plurality of openings through which the filler alloy can be seen to ensure that there is sufficient filler alloy to secure the connection between the saddle portion and the intermediate portion of the second tubular member. The filler alloy of the connection is a brazing material that forms an intermetallic alloy with both the saddle portion of the connector and the intermediate portion of the second tubular member. Brazing materials that melt at a higher temperature than solders provide a stronger connection and are thus preferable.

In the preferred construction of the vehicle body space frame, the connector includes a weld that fuses the end connection portion of the connector and the terminal end of the first tubular member.

In its preferred construction, the vehicle body space frame has the clamp attachers of the saddle portion constructed as projections that extend away from the end connection portion of the connector. These clamp attachers preferably are constructed to include holes for securing a clamp during assembly of the saddle portion of the connector to the intermediate portion of the second tubular member.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
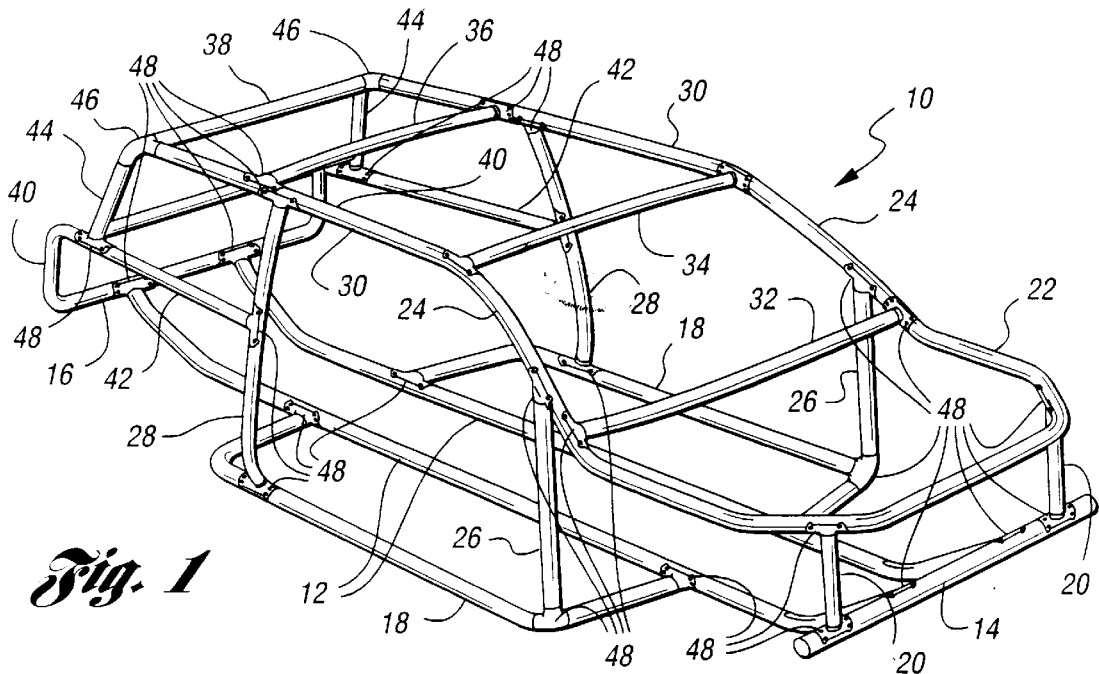
FIG. 1 is a perspective view of a vehicle body space frame constructed in accordance with the present invention.

With reference to FIG. 1 of the drawings, a vehicle body space frame generally indicated by 10 is constructed in accordance with the present invention and made from metallic tubular members that are preferably stainless steel as is hereinafter more fully described. More specifically, the space frame 10 includes a pair of longitudinally extending lower members 12 whose front and rear ends are respectively connected to laterally extending front and rear tubular members 14 and 16. Inwardly opening U-shaped tubular members 18 are connected to intermediate portions of the longitudinally extending lower tubular members 12 at forward and rearward locations. Vertical tubular members 20 project upwardly from opposite ends of the front tubular member 14 and support an upper front tubular member of a rearwardly opening U-shaped tubular member 22 whose rear ends are respectively connected to lower ends of windshield side pillar tubular members 24. Front and rear vertical tubular members 26 and 28 respectively extend upwardly from the U-shaped tubular members 18 at forward and rearward locations. The front vertical tubular members 26 support the windshield side pillar tubular members 24 whose rear ends are connected to roof rail tubular members 30 that extend rearwardly and are supported by the rear vertical tubular members 28. Laterally extending tubular members 32 and 34 respectively connect the upper and lower ends of the windshield side pillar tubular members 24 while intermediate and rear laterally extending tubular members 36 and 38 connect the roof rail tubular members 30. The rear tubular member 16 has opposite sides 40 that extend upwardly and also has forwardly projecting ends 42 that are connected to the rear vertical tubular members 28. Inclined rear window pillar tubular members 44 extend upwardly from the forwardly projecting tubular member portions 42 and support three-legged connection members 46 which in turn support the rear ends of the roof rail tubular members 30 and the opposite lateral ends of the rear tubular member 38.

The vehicle body space frame 10 of the invention as illustrated in FIG. 1 also includes a plurality of metallic connectors 48 that secure terminal ends of certain tubular members to intermediate portions of other tubular members in a transversely extending relationship as is hereinafter more fully described. All of the tubular members described above as well as these connectors are made of stainless steel such that no rustproof processing is required.

Figure 2:
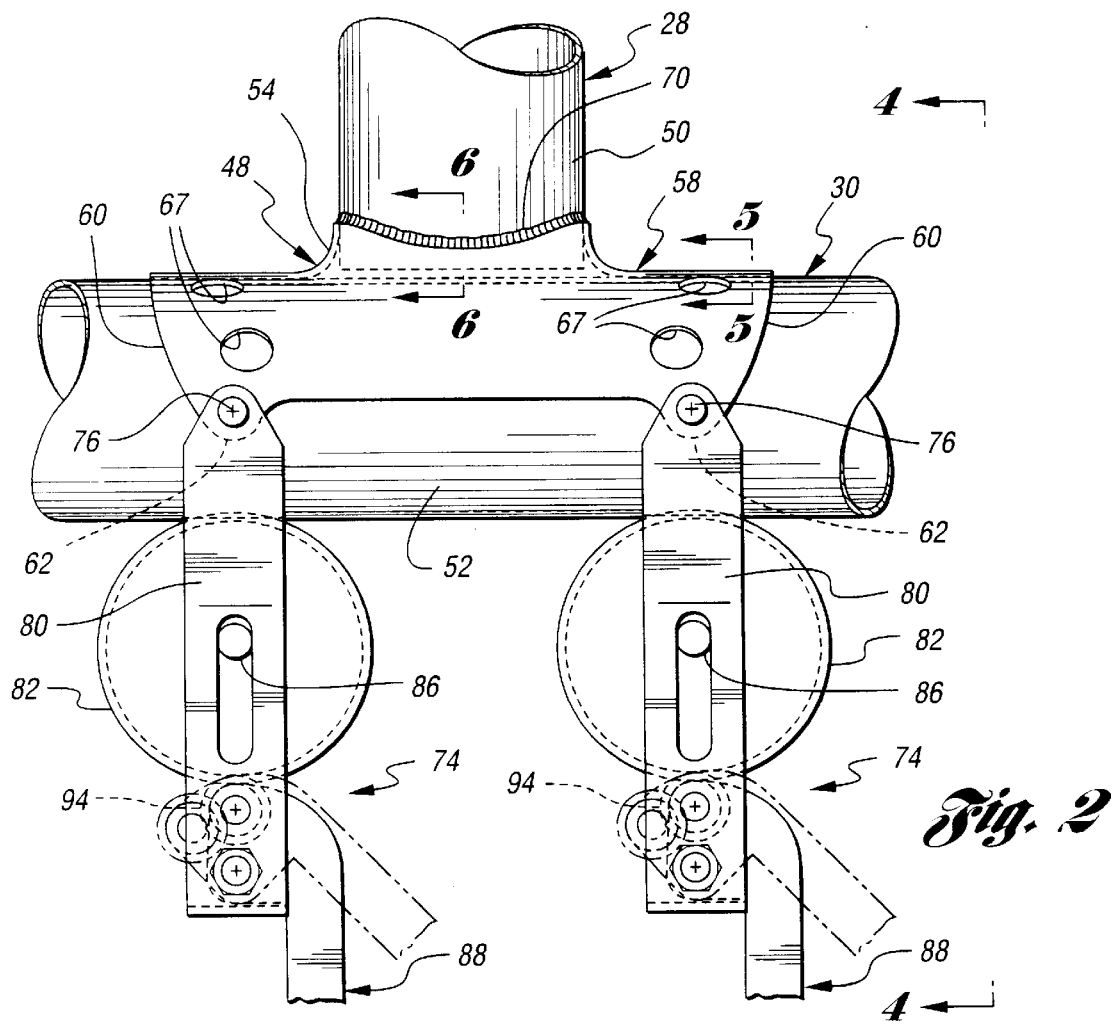
FIG. 2 is a partial side view illustrating the manner in which the terminal end of a first tubular member is secured to an intermediate portion of a second tubular member in a transversely extending relationship by a connector that is clamped in position by clamps to permit securement by a filler alloy.

With reference to FIG. 2, one of the rear tubular members 28 and its associated roof rail tubular member 30 are illustrated with the associated connector 48. Specifically, the tubular member 28 has a terminal end 50 located adjacent the connector 48. Tubular member 30 has an intermediate portion 52 located adjacent the connector 48 and the terminal end 50 of the tubular member 28 in a transversely extending relationship which is illustrated as perpendicular. However, it should be noted that the transversely extending relationships between the connected tubular members can also be skewed such as illustrated by the connection in FIG. 1 of the upper end of each front vertical tubular member 26 and the associated windshield pillar tubular member 24.

Figure 3:
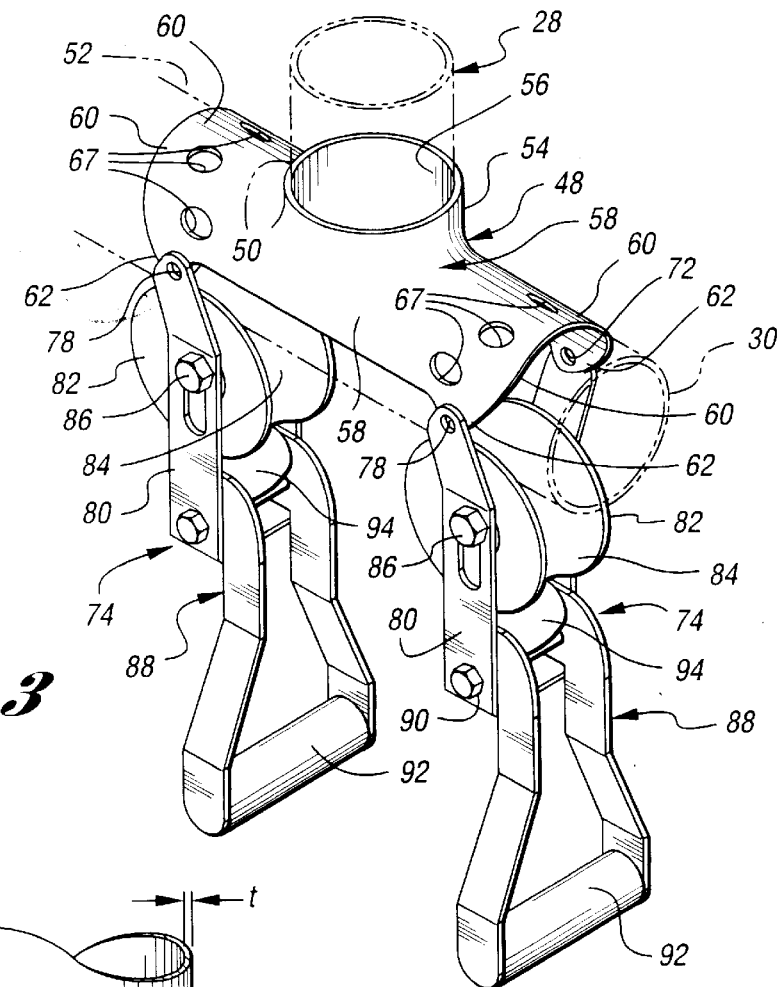
FIG. 3 is a perspective view that further illustrates the manner in which the connector secures the first and second tubular members to each other.
Figure 4:
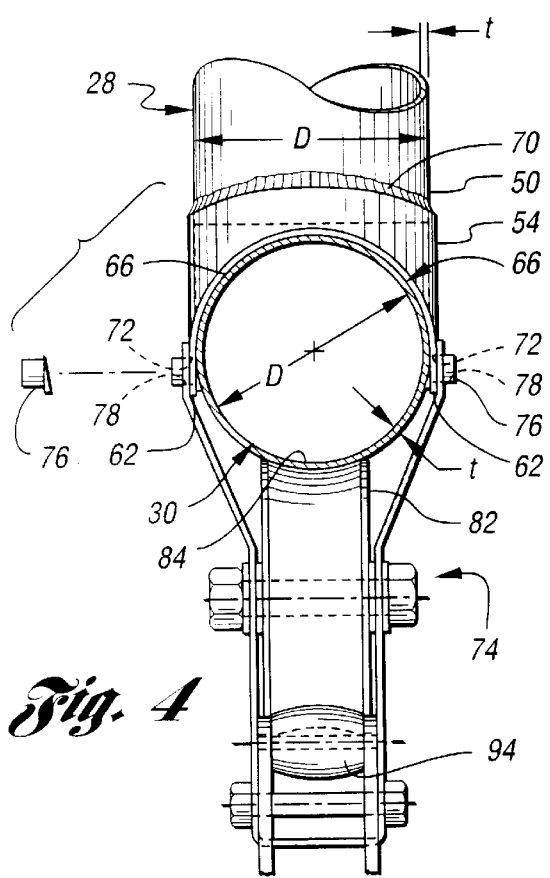
FIG. 4 is an end view taken along the direction of line 4–4 in FIG. 2 to further illustrate the manner in which the first and second tubular members are secured to each other by the connector.

With continuing reference to FIG. 2 and also to FIGS. 3 and 4, the connector 48 is formed from sheet stainless steel by a stamping process and includes an end connection portion 54 having an opening 56 that receives the terminal end 50 of the tubular member 28 in a secured relationship. The connector 48 also includes a saddle portion 58 that extends from the end connection portion 54 and receives the intermediate portion 52 of the tubular member 30. This saddle portion 58 has opposite ends 60 each of which includes a pair of spaced clamp attachers 62 for use in clamping the saddle portion against the intermediate portion 52 of tubular member 30 for assembly as is hereinafter more fully described. A connection 64 (FIGS. 4 and 5) includes a filler alloy 66 that secures the saddle portion 58 to the intermediate portion 52 of tubular member 30.

The construction of the connector 48 in association with the tubular members 28 and 30 as described above permits a connection therebetween while utilizing relatively thin wall tubular members such that the resulting space frame is lightweight while still having the requisite strength. More specifically, the tubular members 28 and 30 each have a wall thickness t and a maximum cross-sectional dimension D that is at least 40 times the associated wall thickness t. More specifically, in the preferred construction illustrated, the first and second tubular members each have a round cross section with the wall thickness t and a diameter D that is at least 40 times the wall thickness t. For example, stainless steel tubular members with nominal diameters of about 6.35 cm and 7.62 cm can have respective wall thicknesses of 1.1 mm and 1.5 mm such that their maximum dimensions provided by the associated diameters D are respectively 58 and 51 times their wall thicknesses whereas conventional tubular members would have to have wall thicknesses for the same nominal diameters of about 2.2 and 3.0 mm such that their maximum cross-sectional dimensions provided by the associated diameter are only respectively about 29 and 25 times their associated wall thicknesses. The thinner walls that can be achieved through the use of the connectors 48 in addition to providing weight savings also results in use of less material such that, even with the more cost per pound of stainless steel, the space frame still is economical.

As best illustrated in FIGS. 2 and 3, the ends 60 of the connector saddle portion 58 each include a plurality of openings 67 through which the filler alloy can be observed to ensure that there is sufficient filler alloy to secure the connection between the saddle portion and the intermediate portion 52 of the tubular member 30. These openings 67 thus prevent a filler alloy starved connection that would be weak and possibly fail.

Figure 5:
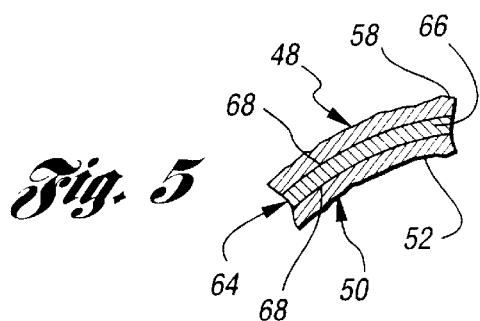
FIG. 5 is a partial sectional view taken along the direction of line 5–5 in FIG. 2 to illustrate the manner in which a filler alloy secures a saddle portion of the connector to the second tubular member.

With reference to FIG. 5, the filler alloy 66 of the connection 64 is a brazing material with a relatively high temperature melting point as opposed to a solder with a lower temperature melting point. This brazing material providing the filler alloy 66 forms an intermetallic alloy 68 with both the saddle portion 58 of the connector 48 and the intermediate portion 52 of the tubular member 50.

Figure 6:
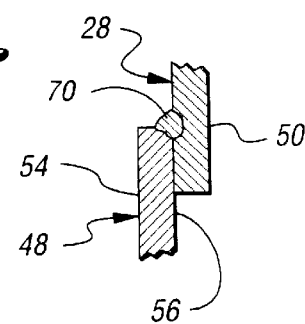
FIG. 6 is a partial sectional view taken along the direction of line 6–6 in FIG. 2 to illustrate the manner in which a weld secures an end connection portion of the connector to a terminal end of the first tubular member.

With reference to FIG. 6, the connector 48 includes a weld 70 that fuses the end connection portion 54 of connector 48 and the terminal end 50 of the tubular member 28. This weld can be made at a main factory site prior to shipment of components of the space frame to a remote assembly location where there is no electrical power for performing welding but where the saddle connection described above can be made by a filler alloy that as mentioned above is preferably a brazing material.

With reference to FIGS. 2, 3 and 4, the clamp attacher 62 of the saddle portion 58 are illustrated as being embodied by projections that extend away from the end connection portion 54 of the connector and preferably include holes 72 for securing an associated clamp 74 that secures the adjacent end 60 for the assembly. As illustrated in FIG. 4, a headed clamp attachment pin 76 has its shank projecting outwardly through each hole 72 of the connector clamp attacher projection and is also received by an associated hole 78 of a clamp yoke 80 whose construction is best illustrated in FIG. 3. The yoke 80 of each clamp receives an associated round clamp member 82 whose round surface 84 is shaped to engage the associated intermediate portion 52 of tube member 30 for a clamping operation. A pin and slot connection 86 between the yoke 80 and the clamp member 82 allows movement of the clamp member under the control of a clamp actuator 88. More specifically, the clamp actuator 88 has a pivotal connection 90 to the closed end of the yoke 80 and has a handle 92 for pivoting thereof to move a clamp actuator member 94. The clamp actuator member 94 has an outer surface 96 complimentary to the clamp member surface 84 so as to facilitate movement thereof for clamping.

With reference to FIG. 2, clockwise rotation of the clamp actuator 88 about connection 90 from the phantom line position to the solid line position moves the actuator member 94 to force the clamp member 82 upwardly which in turn pulls the saddle portion 58 of the connector 48 downwardly into clamped engagement with the intermediate portion 52 of tubular member 30. The relatively close engagement of these members facilitates securement thereof by a filler alloy upon heating and specifically through the use of a brazing material so as to provide a relatively high strength connection as previously described.

Any suitable type of brazing material can be utilized such as a silver brazing material and the requisite heat can be applied through a gas torch, heating of the tubular member 30 and the connector 48 prior to the connection as well as heating of the clamp so that heat therefrom flows to the connector and the tube member 30 upon clamping. The brazing provided by the assembly provides a high strength connection without deforming the stainless steel tubular member 30 and the stainless steel connector 48 as well as the stainless steel tubular member 28 secured to the end connection 54.

Figure 7:
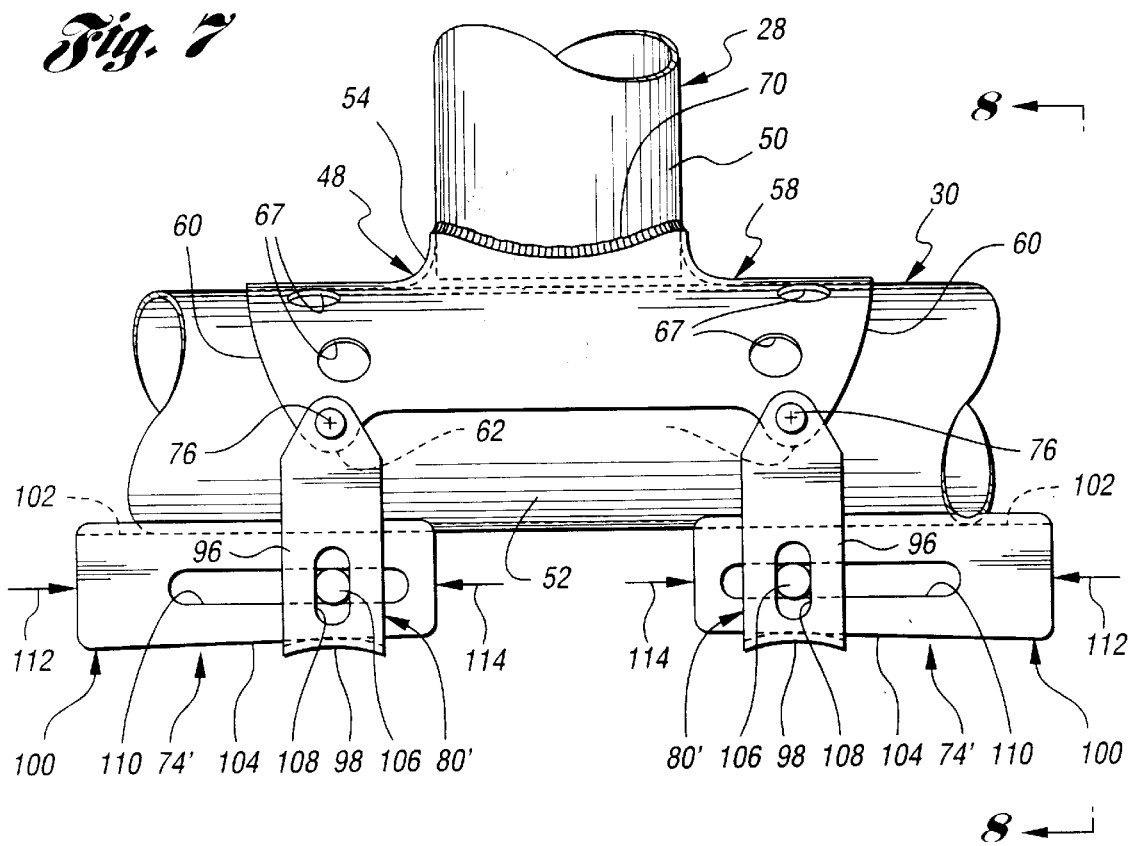
FIG. 7 is a view similar to FIG. 2 but illustrating an alternative construction of the clamps.
Figure 8:
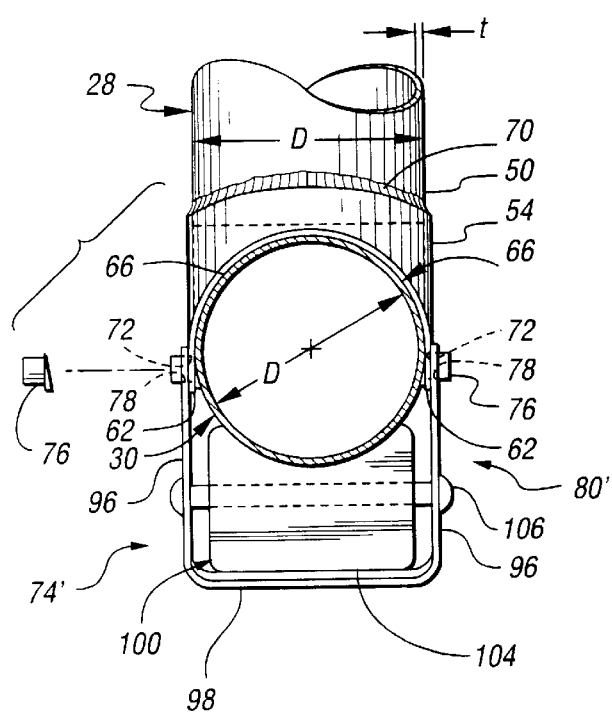
FIG. 8 is an end view taken along the direction of line 8–8 in FIG. 7 to further illustrate the alternative construction of the clamps.

With reference to FIGS. 7 and 8, an alternative embodiment of the clamps 74' each has its yoke 80' constructed to include a pair of spaced vertical legs 96 whose upper ends have holes that receive the associated attachment pins 76 and whose lower ends are connected by a web 98 of the clamp yoke. This yoke web 98 has a curved cross section as shown in FIG. 7. A wedge actuator 100 of each clamp 74' has an upper curved surface 102 (FIG. 8) that engages the intermediate portion 52 of the tube member 30. A lower curved surface 104 of each wedge actuator 100 engages the curved yoke web 98 and is angled with respect to the elongated length of the upper surface 102 so as to provide the wedge construction. A pin 106 extends through a vertical slot 108 in each yoke leg 96 and through a horizontal slot 110 in the wedge actuator 100 between its upper surface 102 and its lower surface 104. A force applied to the wedge actuator 100 in the direction indicated by each arrow 112, such as by a mallet or other suitable tool, pulls the saddle portion 58 of the connector 48 against the intermediate portion 52 of tube member 30 in order to permit the securement by the filler alloy as previously described. Thereafter, the clamps 74' can be removed by application of a force in the direction indicated by arrows 114 to thus permit removal of the clamps from the connected tube members.

While the best mode for carrying out the invention has been described in detail, those familiar with the art to which this invention relates will recognize various alternative designs and embodiments for carrying out the invention as defined by the following claims.

What is claimed is:

1. In a vehicle body space frame, the invention comprising:
   a first metallic tubular member having a terminal end;
   a second metallic tubular member having an intermediate portion that is located adjacent the terminal end of the first tubular member in a transversely extending relationship; and
   a metallic connector including an end connection portion having an opening that receives the terminal end of the first tubular member in a secured relationship, the connector also including a saddle portion that extends from the end connection portion and receives the intermediate portion of the second tubular member, the saddle portion having opposite ends each of which includes a pair of spaced clamp attachers for use in clamping the saddle portion against the intermediate portion of the second tubular member for assembly, and a connection including a filler alloy of a brazing material that forms an intermetallic alloy with both the saddle portion of the connector and the intermediate portion of the second tubular member to provide securement thereof to each other.

2. A vehicle body space frame as in claim 1 wherein the first and second tubular members and the connector are each made from stainless steel.

3. A vehicle body space frame as in claim 1 or 2 wherein the first and second tubular members each have a wall thickness t and a maximum cross-sectional dimension that is at least 40 times its wall thickness t.

4. A vehicle body space frame as in claim 1 wherein the first and second tubular members each have a round cross section.

5. A vehicle body space frame as in claim 4 wherein each of the round tubular members has a wall thickness t and has a diameter D that is at least 40 times its wall thickness t.

6. A vehicle body space frame as in claim 1 wherein each end of the saddle portion of the connector includes a plurality of openings through which the filler alloy can be observed to ensure that there is sufficient filler alloy to secure the connection between the saddle portion and the intermediate portion of the second tubular member.

7. A vehicle body space frame as in claim 1 wherein the connector includes a weld that fuses the end connection portion of the connector and the terminal end of the first tubular member.

8. A vehicle body space frame as in claim 1 wherein the clamp attachers of the saddle portion comprise projections that extend away from the end connection portion of the connector.

9. A vehicle body space frame as in claim 1 wherein the clamp attachers include holes for securing a clamp during assembly of the saddle portion of the connector to the intermediate portion of the second tubular member.

10. A vehicle body space frame as in claim 1 wherein the clamp attachers comprise projections that extend away from the end connection portion of the connector, and each projection having a hole for securing a clamp during assembly of the saddle portion of the connector to the intermediate portion of the second tubular member.

11. In a vehicle body space frame, the invention comprising:
   a first tubular member made of stainless steel with a round cross section and having a terminal end;
   a second tubular member made of stainless steel with a round cross section and having an intermediate portion that is located adjacent the terminal end of the first tubular member in a transversely extending relationship;
   each of the round tubular members having a wall thickness t and having a diameter D that is at least 40 times its wall thickness t; and
   a connector made of stainless steel and including an end connection portion having an opening that receives the terminal end of the first tubular member, a weld that fuses the end connection portion of the connector to the terminal end of the first tubular member in a secured relationship, the connector also including a saddle portion that extends from the end connection portion and receives the intermediate portion of the second tubular member, the saddle portion having opposite ends each of which includes a pair of spaced clamp attachers that include projections extending away from the end connection portion, each projection having a hole for use in clamping the saddle portion against the intermediate portion of the second tubular member for assembly, and a connection including a filler alloy of a brazing material that forms an intermetallic alloy with both the saddle portion of the connector and the intermediate portion of the second tubular member.

12. In a vehicle body space frame, the invention comprising:

a first tubular member made of stainless steel with a round cross section and having a terminal end;

a second tubular member made of stainless steel with a round cross section and having an intermediate portion that is located adjacent the terminal end of the first tubular member in a transversely extending relationship;

each of the round tubular members having a wall thickness t and having a diameter D that is at least 40 times its wall thickness t; and a connector made of stainless steel and including an end connection portion having an opening that receives the terminal end of the first tubular member, a weld that fuses the end connection portion of the connector to the terminal end of the first tubular member in a secured relationship, the connector also including a saddle portion that extends from the end connection portion and receives the intermediate portion of the second tubular member, the saddle portion having opposite ends each of which includes a pair of spaced clamp attachers that include projections extending away from the end connection portion, each projection having a hole for use in clamping the saddle portion against the intermediate portion of the second tubular member for assembly, the opposite ends of the saddle portion each also including a plurality of openings and a connection including a filler alloy of a brazing material that forms an intermetallic alloy with both the saddle portion of the connector and the intermediate portion of the second tubular member, and the openings in the opposite ends of the saddle portion permitting the filler alloy to be observed to ensure that there is sufficient filler alloy to secure the connection between the saddle portion and the intermediate portion of the second tubular member.

* * * * *

UNITED STATES PATENT AND TRADEMARK OFFICE
CERTIFICATE OF CORRECTION

PATENT NO : 5,848,853
DATED : December 15, 1998
INVENTOR(S) : Alain J-M Clenet

It is certified that error appears in the above-identified patent and that said Letters Patent is hereby corrected as shown below:

In the Abstract, line 15, delete "preferably".

Signed and Sealed this

Fourth Day of May, 1999

*Attest:*

Q. TODD DICKINSON

*Attesting Officer*   Acting Commissioner of Patents and Trademarks